United States Patent

[11] 3,556,202

[72] Inventors William F. Stockford;
Joseph M. Gamewell, Salisbury, N.C.
[21] Appl. No. 827,455
[22] Filed Apr. 25, 1969
[45] Patented Jan. 19, 1971
[73] Assignee Gamewell Mechanical, Inc.
Salisbury, N.C.
a corporation of North Carolina

[54] AIR CONDITIONING SYSTEM
14 Claims, 10 Drawing Figs.
[52] U.S. Cl. .................................................. 165/3,
165/66, 165/119
[51] Int. Cl. .................................................. F24f 3/14
[50] Field of Search ..................................... 165/3, 22,
50, 66, 119

[56] References Cited
UNITED STATES PATENTS
2,542,763 2/1951 Frisk ............................ 165/3
2,862,434 12/1958 Edwards ...................... 165/66

Primary Examiner—Charles Sukalo
Attorney—Hunt, Heard & Rhodes

ABSTRACT: The present invention is directed to a practical system for providing year around air conditioning for a manufacturing plant wherein large quantities of air must be exhausted, approximately one-half of which is contaminated with a fumous contaminant, said portions being exhausted from diverse manufacturing areas. Such contaminated air can neither be recirculated within the area from which it is exhausted, nor can it be used in another area without further treatment. The plant according to the present invention may be heated in the winter and cooled in the summer by a single refrigeration/heating unit which operates much more efficiently than heretofore by the utilization of a heat reclaiming device whereby the incoming air is precooled by the exhaust air in the summer and preheated by the exhaust air in the winter. In addition, the system is enhanced by a cyclone-type dust collector including a rotary drum filter therein which effectively removes the solid contaminants from the air stream and reintroduces the cleansed air for recirculation.

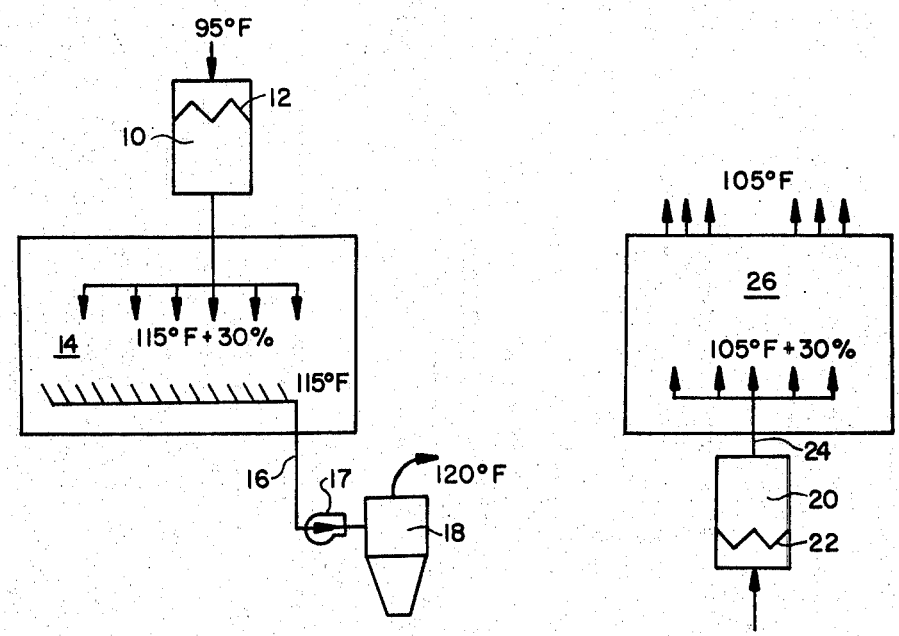
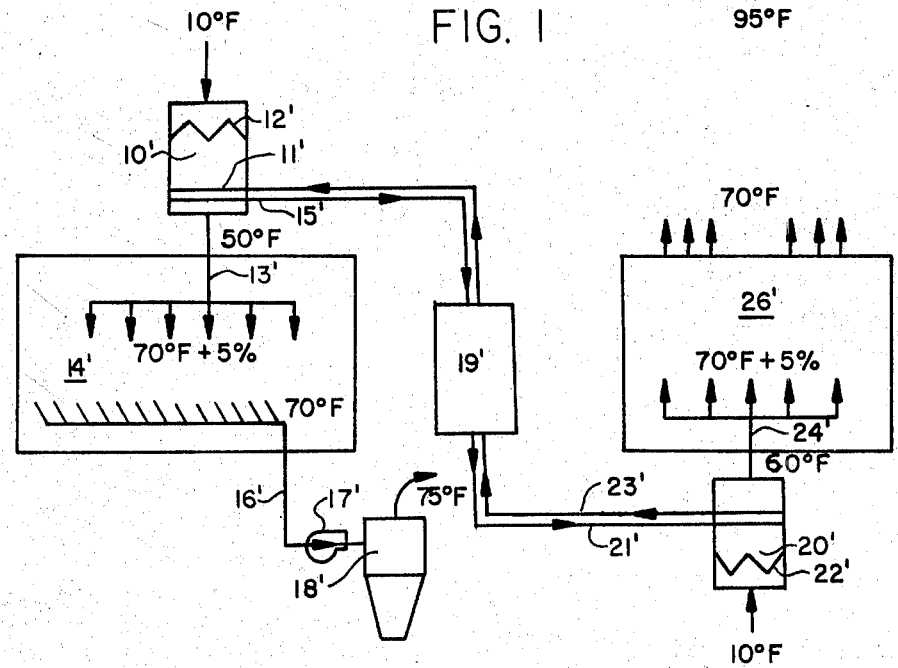
FIG. 1
FIG. 2

PATENTED JAN 19 1971 3,556,202

A → EXHAUST AIR

B ← INCOMING AIR

INVENTORS
JOSEPH M. GAMEWELL
WILLIAM F. STOCKFORD
BY
Hunt & Rhodes
ATTORNEYS

PATENTED JAN 19 1971

INVENTORS
JOSEPH M. GAMEWELL
WILLIAM F. STOCKFORD
BY
*Hunt & Rhodes*
ATTORNEYS

# 3,556,202

1

AIR CONDITIONING SYSTEM

BACKGROUND OF THE DISCLOSURE

In recent years, industrial psychologists have found it increasingly more important to maintain comfortable working conditions for workers, in order to realize maximum output from them. Some types of manufacturing concerns have found it more of a problem than originally thought to air condition and heat properly, especially where the manufacturing is divided into several distinct areas in which the heating and humidity requirements differ noticeably, or where the manufacturing processes release relatively large quantities of contaminants into the air which prevents its recirculation or circulation into another area.

For example, in the furniture industry, it is customary to have a woodworking area completely separate from the painting or finishing area. It is not possible to circulate the air through the woodworking area and then into the painting or finishing area, because of the fine dust and other wood particles which are released into the air in the woodworking area as a result of the sanding and other wood shaping processes. On the other hand, it is not desirable to utilize the exhaust air from the painting and finishing area anywhere in the plant, because of the fumes which are present in the exhaust air as a result of the painting and finishing operations.

Both of these areas require a rapid exhaust of large quantities of the air to remove the contaminants from the areas in which people are working. Since the same amount of air being exhausted must be returned to the plant as makeup air, the obvious solution would be to provide each area with its own air conditioning and heating connected with the makeup air system. This proves to be almost prohibitively costly indeed in comparison to a system in which only one air conditioning and heating unit is required. Moreover, it has been found during periods of extreme outside temperature such as in midsummer or midwinter, the operation of the air conditioner or heating unit might be aided by utilizing the contaminated exhaust air from one area to precool or preheat the incoming air.

SUMMARY OF THE INVENTION

The present invention, on the other hand, provides a single heating/cooling unit which provides coolant in the summer and heating fluid in the winter to a makeup unit, the output of which is used, first of all, in the woodworking area and then is filtered and circulated through the painting area. A cyclone-type dust collector having a self-cleaning, rotary drum filter mounted therein interrupts the flow of exhaust air from the woodworking area and thoroughly removes the dust and other contaminants therein so that the same air may be used in the painting area. This air is then passed through a standard washer to evaporatively cool the air and to further remove any wood particles or odors which might not be removed in the filter unit.

A further feature of the invention is the use of a heat reclaimer which receives the exhaust air from the painting or finishing area at a moderate temperature and passes the exhaust air in thermal conductive relation with the incoming atmospheric air. Such a process precools the incoming air in the summer and preheats the incoming air in the winter, before it is delivered to the heating/cooling unit, providing a more economical operation since the incoming atmospheric air does not have to undergo as much of a change in temperature as otherwise in the case.

It is therefore an object of this invention to provide a practical year around air-conditioning system controlling temperature and humidity in a manufacturing plant requiring a large volume of exhaust air, approximately one-half of which contains a solid contaminant and approximately one-half of which contains a fumous contaminant, said portions being exhausted from diverse areas of manufacture.

It is another object of this invention to provide a balanced year around air-conditioning system for controlling the temperature and humidity in a manufacturing plant requiring a

2 large volume of exhaust air, approximately one-half of which contains a solid contaminant and approximately one-half of which contains a fumous contaminant including a single heating/cooling unit of a smaller size than would be required if both areas were heated and cooled individually.

It is yet another object of this invention to provide a balanced year around air-conditioning system for controlling the temperature and humidity in a manufacturing plant requiring a large volume of exhaust air, approximately one-half of which contains a solid contaminant and approximately one-half of which contains a fumous contaminant, said portions of air being exhausted from two separate areas of the plant, wherein the air containing the solid contaminants which is exhausted from the first area is so treated as to be usable in heating or cooling the second area.

It is still another object of this invention to provide a balanced year around air-conditioning system for a manufacturing plant requiring a large volume of exhaust air, approximately one-half of which contains a solid contaminant and approximately one-half of which contains a fumous contaminant, said portion of air being exhausted from two separate areas of the plant, wherein the contaminated air exhausted from the second operating area is utilized to pretreat the incoming atmospheric air so that the system operates more economically.

It is yet a further and more specific object of this invention to provide a balanced year around air-conditioning system of the type described above wherein a heat reclaiming unit receives contaminated air exhausted from the second manufacturing area and transfers the heat into or absorbs the heat from the incoming air without any actual mixing of the two bodies of air.

A further object of the invention is to provide a balanced year around air-conditioning system of the type described above utilizing a cyclone-type dust collector having a self-cleaning, permanent rotary drum filter mounted therein for receiving and cleaning air containing solid contaminants from one of the manufacturing areas to such an extent, that the filtered air may be used in the other area.

Some of the objects of the invention having been stated, other objects will appear as the description proceeds when taken in connection with the accompanying drawings, in which:

FIG. 1 is a schematic representation of a standard makeup and exhaust system showing the normal temperature and humidity levels during summer operation;

FIG. 2 is a schematic representation similar to FIG. 1, except showing the winter operation;

Figure 3:
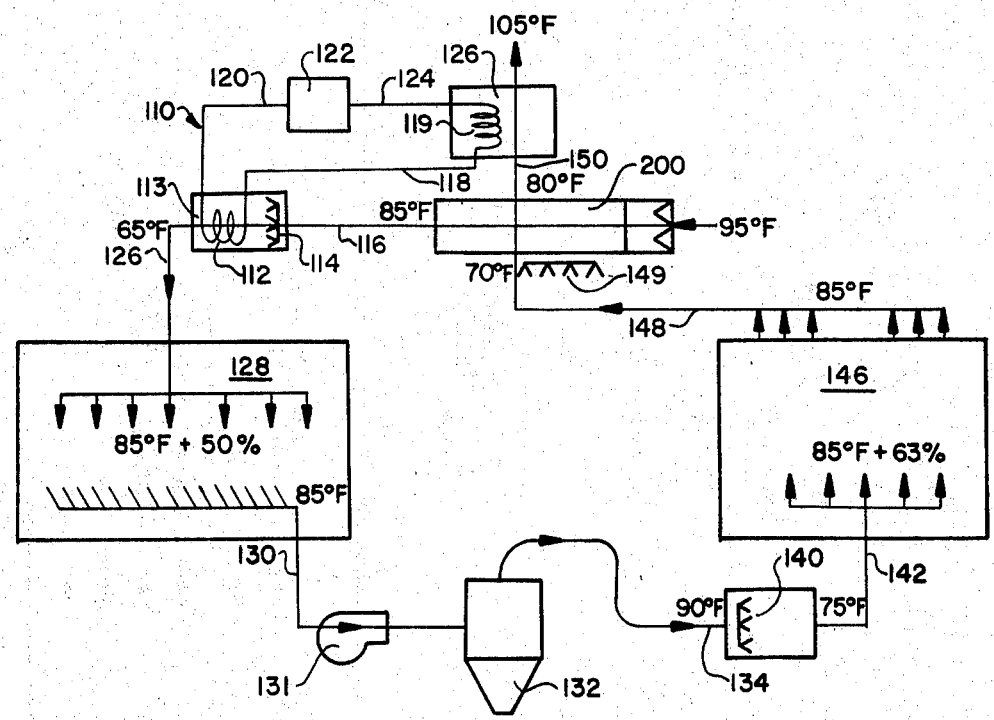
FIG. 3 is a schematic representation of the air-conditioning system according to the present invention, and showing the normal temperature and humidity levels during summer operation.

Referring now to the drawings, and more particularly to FIGS. 1 and 2, there is shown a standard makeup and exhaust system according to previous designs.

As shown in FIG. 1, there is generally no air conditioning or refrigeration provided at the input of atmospheric air at such plants during summer months, because the tremendous ventilation requirements of the dust collection system and the paint booth exhaust system normally make the size of the cooling unit prohibitive and economically not feasible. Therefore, in existing furniture plants, for example, where the outside temperature was 95° F., the atmospheric air is drawn into the plant through a makeup unit 10 with no change whatsoever, except possibly a filtering operation through filter 12. The air is then introduced into the woodworking area 14, where, because of the activity taking place, the temperature rises to approximately 115° F. and a humidity of approximately 30 percent. The air is then drawn by fan 17 over the various woodworking machines and through a conduit 16 whereupon it is delivered to some sort of filter, such as a cyclone dust collector 18 which deposits the dirt and dust particles in the bottom thereof and allows the filtered air to escape to the atmosphere through the top. At the same time a second makeup unit 20 receives air from the atmosphere, passes it through filter 22 whereupon it is supplied to the painting or finishing area 26 through conduit 24. The operations in the painting or finishing area cause the temperature to rise to approximately 105° F. and a humidity of approximately 35 percent, whereupon it is exhausted directly to the atmosphere after absorbing overspray and drying fumes.

FIG. 2 illustrates the operation of a typical prior system during the winter, and for purposes of explanation, it is assumed that the incoming temperature is approximately 10° F. Makeup unit 10' comprises a filter 12' through which the incoming air passes and some appropriate heating device such as a pair of heating coils 11' and 15' which are connected with boiler 19' or other source of heat. As the atmospheric air passes over the coils, it is elevated to at least a temperature of 50° F. before entering the woodworking area 14' through conduit 13'.

The lights and activity in area 14' generally cause the temperature to be further elevated to as much as 70° F. with relative humidities as low as 5 percent. This air is collected and drawn into conduit 16' by fan 17' and filtered through some type of filter such as cyclone filter 18' whereupon it is exhausted to the atmosphere at a temperature of approximately 75° F. It can readily be seen that if this air being exhausted to the atmosphere at 75° F. could be recirculated or routed through some other area, there could be a significant saving in the cost of heating, however this air is contaminated by the sawdust and other fine particles entrapped in the air in the woodworking area and cannot be reused.

In the finishing or painting area 26' of the plant, a second makeup unit 20' includes an appropriate heating device such as a pair of heating coils 21' and 23' connected with boiler 19' or other heating media. The incoming atmospheric air passes through filter 22' and then over coils 21' and 23' containing steam or hot water, whereupon the air is warmed to a temperature of at least 60° F. before being delivered into the painting area 26' through conduit 24'. In the painting area the temperature rises to approximately 70° F. with a relative humidity as low as 5 percent, whereupon it is exhausted to the atmosphere through the paint booths.

HEAT SAVER SYSTEM

Figure 4:
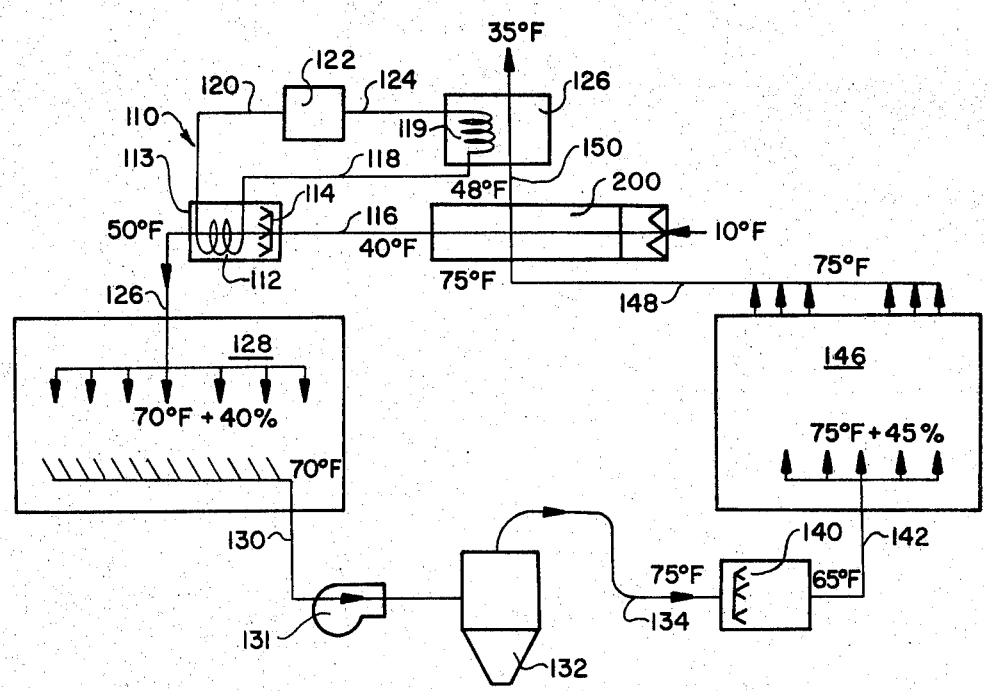
FIG. 4 is a schematic representation similar to FIG. 3, except showing the winter operation.

Turning now to FIGS. 3 and 4, the summer and winter systems respectively, according to the present invention, are shown. In FIG. 3, it is assumed that the same atmospheric temperature of 95° F. prevails for purposes of this discussion as was the case in the discussion of FIG. 1. Heat exchanger 200 is of the air-to-air type which first receives the atmospheric air and precools it to a temperature of approximately 85° F. before delivering it to conduit 116. Heat exchanger 200 adds no mechanical refrigeration to the atmospheric temperature, rather subjects the atmospheric air to a thermal engagement with the exhaust air leaving the painting area and evaporatively cooled with water to a temperature of approximately 70° F. This stage precools the atmospheric air, so that the makeup unit 110 does not require as much mechanical cooling as would otherwise be required to lower the temperature to 65° F. from 95° F.

The mechanical refrigeration makeup unit 110 which draws in the incoming air through conduit 116 also includes a means for mechanically cooling the incoming air. For example, a housing 113 receives the incoming air from conduit 116 and also has mounted therein a spray coil unit 112 which circulates cooling media from compressor 122 over which the air passes. Water sprayed from nozzles 114 onto conduit 116 and/or housing 113 evaporates into the airstream, thereby providing a source of humidity control for the woodworking area 128. This improves the efficiency of all the woodworking operations and improves the final quality of the product by maintaining a relatively constant wood moisture content year around.

A smaller conduit or pipe 118 circulates the refrigerant or cooling media from the heat rejection or condenser coil 119 to the cooling coil 112 whereupon it is returned through pipe 120 to compressor 122. The refrigerant is then put under pressure and fed to the condenser coil 119 where it is condensed into liquid form. It then passes to pipe 118, back to spray coil 112 whereupon the cycle is completed.

To further increase the efficiency of makeup unit 110, the relatively cool air being exhausted from the paint booths, after passing through the heat reclaimer, passes through the heat rejection device 126 wherein the heat picked up by the cooling media in spray coil 112 and present in coil 119 is removed and discharged into the atmosphere.

The combined effect of the heat exchanger 200 and mechanical makeup unit 110 lowers the temperature of the air leaving makeup unit 110 through conduit 126 to a temperature of approximately 65° F. whereupon it is introduced into the woodworking area 128. The operations in the woodworking area 128 elevate the temperature to approximately 85° F. and lower the relative humidity to approximately 50 percent. Sawdust and other fine dust particles present in the woodworking area contaminate the air and make it unsatisfactory for subsequent use in that condition.

Figure 8:
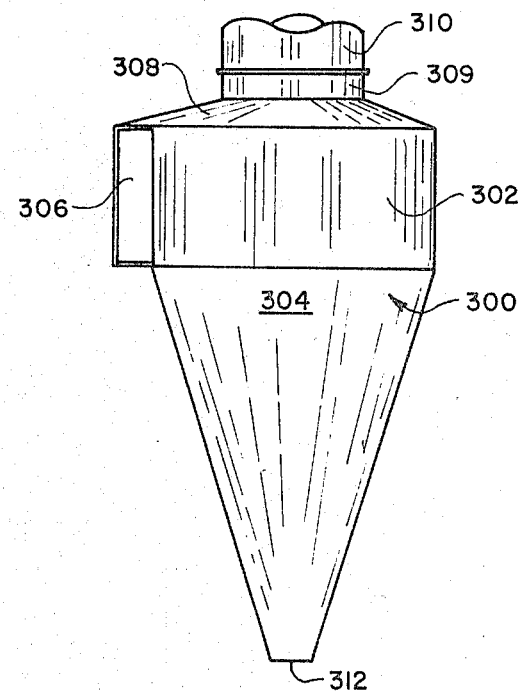
FIG. 8 is a perspective view showing the cyclone dust collector used in the present system.
Figure 10:
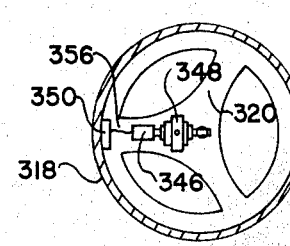
FIG. 10 is a view taken substantially along line 10—10 in FIG. 9.
Figure 9:
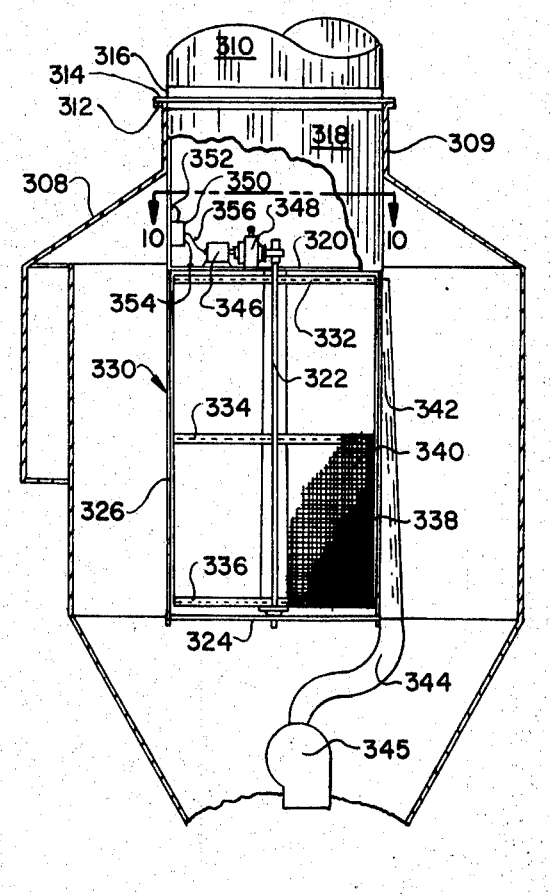
FIG. 9 is a vertical sectional view showing the automatic drum filter mounted inside the collector with certain parts not shown in section for the purposes of clarity.

The contaminated air is collected in the dust collection system by collector fan 131 which draws the air into conduit 130, whereupon it is delivered to a unique type of cyclone dust collector 132 including a permanent, self-cleaning rotary drum filter mounted therein as illustrated in FIGS. 8—10 and hereinafter described to thoroughly cleanse the air. For the purposes of the present discussion it is sufficient to note that the sawdust and other contaminating particles are completely removed from the air in collector 132, so that the filtered air is pure enough to be reused, however the collection process elevates the temperature somewhat to approximately 90° F. This air is carried by conduit 134 to an air washer 140 in which the air is subjected to a spray to lower the temperature, pick up moisture content, and remove any solid contaminants or odors which may bypass the dust collector 132 before exiting through a set of eliminator blades which remove the excess moisture from the air. This saturated air at approximately 75° F. is subsequently carried through conduit 142 and introduced into the painting or finishing area 146.

In the painting or finishing area, the air increases in temperature to approximately 85° F. with a relative humidity of at most 60 percent and picks up flammable paint fumes, whereupon it is drawn from the area into conduit 148 by exhaust fans. During summer months, this exhaust air is subjected to a non-recirculated water spray 149 which decreases the temperature to approximately 70° F. This air then passes through the heat reclaimer 200 in thermal contact with the incoming air in a manner described below, which subsequently transfers heat from the incoming air lowering it to a temperature of approximately 85° F. The exhaust air then exits from heat reclaimer 200 through conduit 150 at a temperature of 80° F., passing through the heat rejection device 126 and picking up heat from coil 119 therein before exiting at a temperature of approximately 115° F.

Referring now to FIG. 4, the winter operation of the heat saver system follows generally the same cycle as that described above, however heat exchanger 200 produces an opposite effect on the incoming air. More specifically, the incoming air is preheated approximately 30° by the exhaust air, so that the mechanical makeup unit of the system does not have to supply as much heat as would be the case if the incoming air came directly into the makeup unit.

Assume the incoming atmospheric air to be at a temperature of 10°F., as it passes through heat exchanger 200 it picks up heat from the exhaust air leaving the painting area at approximately 75° F. by nature of the thermal engagement in the heat exchanger, with the result that the incoming air is heated approximately 30° to a temperature of approximately 40° F. before delivered to conduit 116. Nozzle 114 sprays water on the coil housing 113 to control the humidity of the air as it passes therethrough. The mechanical refrigeration system is reversed to add heat into the incoming air, and a warming media is passed through spray coil 112 to heat the incoming air to a minimum temperature of approximately 50° F.

In winter operations, coil 119 receives the refrigerant from coil 112 through pipe 118. The refrigerant gas is pulled from coil 119 by compressor 122 through pipe 124 whereupon it is compressed and delivered to coil 112 through pipe 120 to warm the incoming air. It is readily apparent that this is merely the reverse of the summer operation of the cooling device. Exhaust air from painting area 146 leaving the heat exchanger 200 passes over coil 119 and adds heat into the cooled refrigerant, so that it is warmer and aids in boiling off the gas in coil 119.

It is to be recognized that the reversible compressor system illustrated and described is only an example of one of many types of heating/cooling systems that could be used with the present invention. Other systems include a furnace/refrigeration compressor, a furnace/water chilling unit, etc.

The heated air at a temperature of 50°. is delivered into the woodworking area 128 through conduit 126, and in area 128, as in the case during the summer, the lights and activity therein elevate the temperature to approximately 70° F. and a relative humidity of at least 40 percent. The contaminated air is drawn from the woodworking area by fan 131 through conduit 130 and again is subjected to the unique cyclone dust collector which cleanses the air, so that it may be reused in the painting area. The air leaves the dust collector 132 through conduit 134 at a temperature of approximately 75° F., whereupon it is subjected to washer 140 for the purpose of adding moisture content to the air. This process also lowers the temperature of the air to approximately 65° F. for delivery to the finishing or painting area 146 through conduit 142.

In the painting area 146 the temperature of the air is elevated to 75° F. and a relative humidity of at least 45 percent, whereupon it is exhausted and delivered into conduit 148 at a temperature of approximately 75° F.

This exhaust air includes paint fumes, so that it may not be reintroduced into the woodworking area, however, as described above, it is passed through the heat reclaimer in thermal engagement with the incoming air, causing the incoming air to rise 30° in temperature. The exhaust air gives up a substantial portion of heat to the incoming air, and is thus exhausted into conduit 150 at a temperature of approximately 45° F. Conduit 150 in turn delivers the air to evaporator 126 where it passes over coil 119 adding heat to the refrigerant as earlier described.

Since it is only necessary for the cooling/heating unit 122 to lower the temperature 20° in the summer and to raise the temperature of the air leaving the heat exchanger approximately 10° in the winter, it becomes apparent that a smaller heating/cooling unit than is used in a 100 percent makeup unit may be used. Moreover, because of the unique cyclone dust collector, the air leaving the woodworking area may be reused in the painting area by merely subjecting it to an air washer to control the humidity in the painting area. Otherwise, a completely separate mechanical refrigeration makeup unit would be necessary for the painting area, which would increase substantially the cost of the system.

HEAT RECLAIMING DEVICE

Heat reclaimer 200, referred to above, comprises essentially a series of light-gauge metal plates 204 and 206 stacked in alternating arrangement, having stiffeners and separators 208 therebetween as required, the assembly being so arranged that incoming atmospheric air entering one side thereof is in thermal engagement with exhaust air entering an adjacent side, however is isolated from actual mixture therewith.

Figure 5:
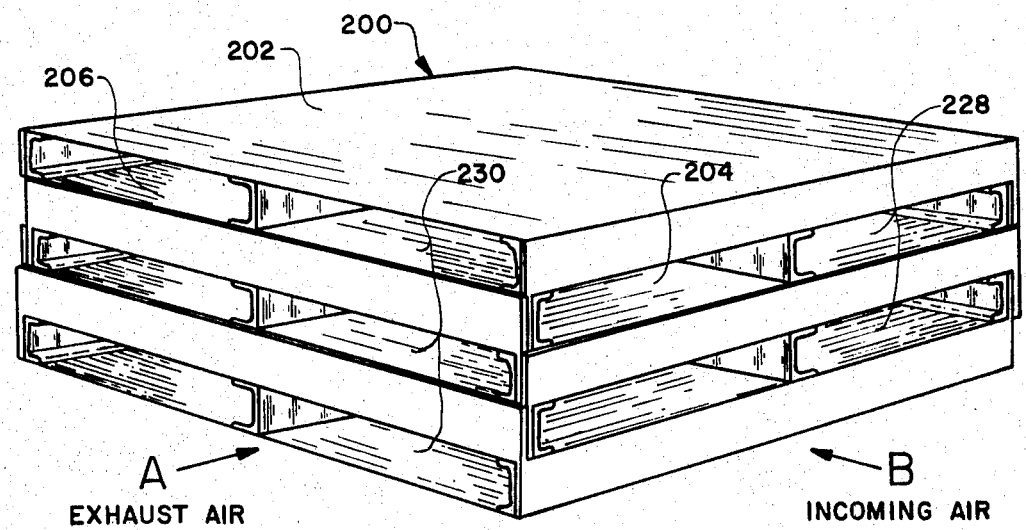
FIG. 5 is a perspective view of the heat transfer module of the heat reclaimer according to the present invention.
Figure 7:
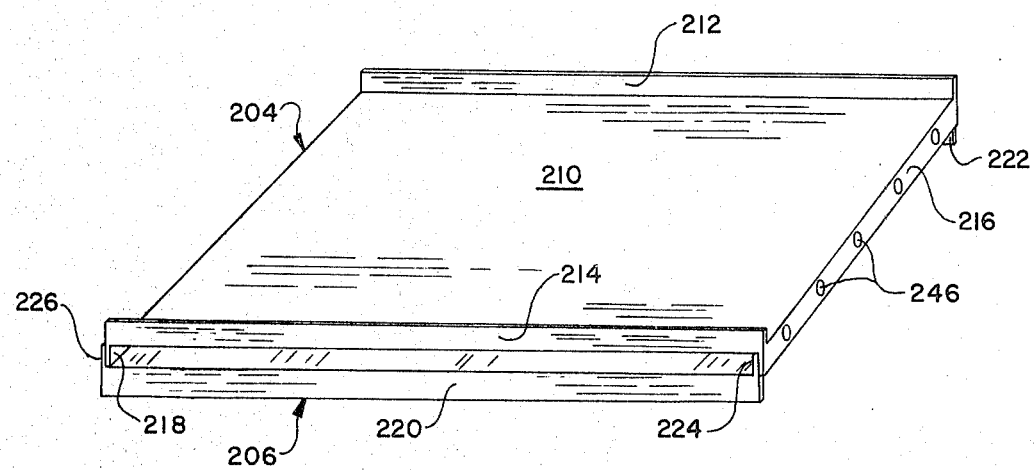
FIG. 7 is a perspective view of one of the plates which forms one layer of the heat transfer module shown in FIG. 5.

Plate 204, as shown in FIG. 7 is formed of a relatively lightweight metal material having good thermal conductivity and comprises a flat rectangular body portion 210 having upturned sidewalls 212 and 214 and downturned end walls 216 and 218. Plate 206 is similar to plate 204, except having downturned sidewalls 220 and 222 and upturned end walls 224 and 226. As best seen in FIG. 7, plates 204 and 206 are so assembled that the upturned sidewalls 212 and 214 of plate 204 overly the downturned sidewalls 220 and 222, and the downturned end walls 216 and 218 overly upturned end walls 224 and 226. The overlapping side and end walls may be joined by any suitable means, as by rivets 246. Additional plates 204 and 206 are alternately assembled as shown in FIG. 5 forming an assembly having alternating passageways 228 and 230 perpendicular to each other. The assembly is covered by a flat plate cover 202.

The incoming atmospheric air enters passageways 228 in the direction of arrow B while the exhaust air enters passageways 230 in the direction of arrow A in FIG. 5. The incoming air is precooled or preheated by the exhaust air which is in thermal engagement through thin plates 204 and 206, however, the two air masses never actually mix with each other since the exhaust air is contaminated with paint fumes.

Figure 6:
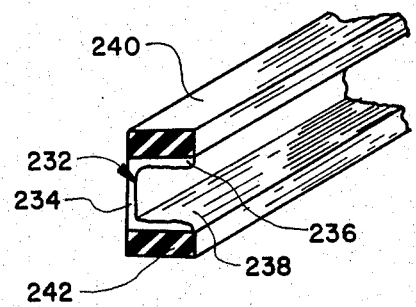
FIG. 6 is an enlarged perspective view with parts broken away, showing a portion of one of the support channels used to separate the layers of the heat transfer module.

Spacers 232 separate plates 204 and 206 and provide support for retaining the plates in spaced relation. As best seen in FIG. 6, spacers 232 comprise a channel member having a web 234 connecting upper leg 236 and lower leg 238. Strips of resilient material 240 and 242 are suitably attached to the outer surface of legs 236 and 238 respectively to dampen vibrations caused by the air masses passing through passageways 228 and 230 in the heat exchanger and to seal the alternate chambers from air leakage.

It should be recognized that the specific structure of the above described heat exchanger is for the purpose of explanation only, and it should be realized that various changes to the assembly and support techniques herein described could be made without departing from the scope of the invention.

CYCLONE DUST COLLECTOR

Referring to FIGS. 8 and 9, there is illustrated a specific embodiment of the cyclone dust collector 132 referred to in the heat saving system described above. Dust collector 132 from the outside resembles a conventional cyclone-type collector in use today and comprises a housing 300 having a cylindrical upper portion 302 and a conical lower portion 304. An opening 306 in one side of cylindrical portion 302 receives conduit 130 and provides an inlet for the air leaving the woodworking area. Housing 300 further includes an inverted dish-shaped cover 308 open in the center and having an upstanding wall 309 around said opening to which conduit 310 is attached, providing an outlet for the filtered air.

The contaminated incoming air enters the collector 132 through inlet 306 and swirls round and round in cyclone fashion inside the collector. The dust particles suspended in the air are forced to the outside walls by centrifugal force, whereupon they fall down onto the conical walls of the lower housing portion 304 and drop through opening 312 in the bottom. The filtered air, on the other hand, exits the collector through the opening in cover 308 and is delivered into conduit 310 for use elsewhere or is released to the atmosphere. The structure described so far is conventional in industrial application today and merely provides a background for the specific structure mounted within and described below.

Turning now to FIG. 9, a self-cleaning, rotary drum filter 330 is suspended within housing 300 from an outwardly extending annular flange 312 attached to the upper end of cover 308. Flange 312 supports a similar annular flange 314 extending outwardly from collar 316 which in turn connects conduit 310 with cylindrical housing 318. Housing 318 fits snugly against the inner surface of upstanding wall 309 and extends down inside housing 300 to support filter 330. The upper end of housing 318 is completely open to allow passage of air, however the floor 320 of housing 318, although generally open, includes a skeletonlike framework (FIG. 10) to provide a mounting surface for the filter controls. Shaft 322 is journaled for rotational movement between upper support 320 and lower support 324, both supports being stationary. Several peripheral braces 326 extend between upper support 320 and lower support 324 to retain the support members in their fixed spaced relation.

Several supporting spokes 332, 334, and 336 are fixedly attached to central rotating shaft 322 for rotation therewith. A first or inner layer 338 of relatively coarse screen is stretched around the periphery of the spokes, and a second layer 340 of finer mesh filter media is laid on the outer surface of screen 338, thus forming a rotatable cylindrical filter.

A suction nozzle 342 is suitably fixed to upper and lower supports 320 and 324 and extends longitudinally along the surface of filter media 340, being stationary with respect to the filter 330 which rotates. A length of flexible hose 344 including a suction fan 345 connects the lower end of nozzle 342 with lower opening 312 and provides a conduit for exhausting the sawdust and other dust particles drawn from the surface of filter media 338.

Rotary drum filters mounted within cyclone-type dust collectors are in themselves old as shown by the U.S. Letters Patent to Hershey, Jr., No. 2,827,128. This patent even teaches the use of a pressure sensitive switch arrangement for turning the rotating cleaning nozzle on and off. The present invention, on the other hand, utilizes a stationary continuous cleaner, rather than a rotating cleaner, that starts and shuts off in response to the pressure differential between the high-pressure and low-pressure sides of the filter media.

A variable speed drive mechanism comprising a motor 346 and speed reducer 348 of the type commercially available, as for example the Graham variable speed ball/disc drive, is mounted within housing 318 on upper support 320. Rotating shaft 322 is connected to the output of the speed reducer 348, thus providing the rotary force necessary to turn the filter media in response to pressure variations between the air outside and inside the drum filter 330.

A pressure sensing device or pressure regulator 350 includes a first pressure sensing nozzle 352 in communication with the air outside the filter media, and a second pressure sensing nozzle 354 in communication with the area inside the filter media. When the pressure differentiation between the two sides of the filter media reaches a predetermined level, the pressure regulator 350 signals the motor 346 which operates the variable speed device 348 through pneumatic line 356, thereby adjusting the rotational speed of the filter media.

The reason for adjusting or varying the speed at which the drum filter 330 rotates is that the filter media 340 is of the surface loading type and comprises wire mesh upon which the dust particles are deposited. This results in a buildup of dust particles on the surface thereof enhancing the filtering effect. If the filter is kept perfectly clean at all times, some of the smaller dust particles will pass through, and on the other hand, if the media becomes laden with too much dirt, the air will not pass through at all. Therefore, it is important to note that a slightly dirty filter is a good filter, and a delicate balance must be kept. The idea is to move the filter media at a given speed past the suction cleaner only fast enough to keep the filter in a desirably dirty condition.

CONCLUSION

Thus, there is provided a year around air-conditioning system which will provide a comfortable temperature and humidity level at all times, resulting in a cleaner more desirable atmosphere in which to work. In certain industries, such as the woodworking industry, it is highly desirable to maintain the humidity level within prescribed limits in order to obtain the highest quality of furniture manufacturing. Year around temperature control increases the productivity of employees, and the continuing change of air provided by the ventilation system described herein prevents the build up of flammable vapors from the painting area.

Although specific temperature and humidity ranges have been set forth as desirable in the above description, it is to be realized that these temperatures and humidity percentages are for purposes of explanation only, and the invention is not limited to such specific ranges, the idea being to be able to control temperature and humidity. Moreover, the specification specifically describes a system for a furniture manufacturing plant comprising a woodworking area and a painting or finishing area. It is to be realized that this type of system may be used in any type of manufacturing in which there are two areas in which diverse manufacturing operations are being carried on prohibiting the direct use of air from one area in the other area. Moreover, the system described above permits the controlled temperature and humidity levels throughout the year in a much more economical and feasible setup than heretofore in use.

Therefore, although a detailed disclosure has been made of a preferred form of the present invention, it will be understood that modifications and variations of the suggested form may be resorted to, while remaining within the scope of the present invention.

We claim:

1. A method of providing year around air conditioning for a manufacturing plant having a first and second area wherein diverse manufacturing operations are being carried on with consequent diverse effects on the temperature and or humidity and cleanliness of the air within said first and second areas, and wherein relatively large volumes of air are circulated, approximately one-half by volume of the circulated air being exhausted from said first area and containing solid contaminants and approximately one-half of the circulated air being exhausted from said second area and containing fumous contaminants, said method comprising the steps of:

a. drawing atmospheric air into the plant air-conditioning system from outside the plant;
   b. pretreating said incoming atmospheric air by subjecting said air to thermal engagement with fumous contaminated air exhausted from said second area while preventing actual mixing of the air masses whereby said incoming air is precooled in the summer and preheated in the winter;
   c. Delivering said incoming pretreated atmospheric air to said first area and contaminating it with solid particles;
   d. thereafter exhausting the solid contaminated air from said first area and cleansing it of said solid particles;
   e. delivering the cleansed air to said second area and contaminating it with fumes;
   f. thereafter exhausting the fumous contaminated air from said second area and delivering it into thermal engagement with said incoming air while preventing actual mixture of the air masses; and
   g. delivering said fumous contaminated air to the atmosphere.

2. The method according to claim 1 wherein subsequent to step (b) said pretreated incoming air is further subjected to a mechanical heating operation in the winter and a mechanical cooling operation in the summer, said heating and cooling operation further includes subjecting said incoming air to a washing operation wherein said air becomes saturated prior to delivery to said first area.

3. The method according to claim 1 wherein the fumous contaminated air is further passed over a coil in a heat rejection device subsequent to step (f) thus transferring heat from the air to the coil in the winter and transferring heat from the coil to the air in the summer operation.

4. The method according to claim 1 wherein the cleansed air is washed in an air washer subsequent to step (d), so that the temperature is lowered and the humidity is elevated to a prescribed level.

5. The method according to claim 1 wherein during the summer months, the fumous contaminated air exhausted from the second area is subjected to a water spray prior to step (f) thereby lowering the temperature of the air prior to its thermal engagement with said incoming air, so that the incoming air is precooled to an even greater extent.

6. A temperature and humidity control for use in a manufacturing plant having a first and second area in which diverse manufacturing operations are being carried on with consequent diverse effects on the temperature and or humidity and cleanliness of the air within said first and second areas, and wherein relatively large volumes of air are circulated, approximately one-half by volume of the circulated air being exhausted from said first area and containing solid contaminants and approximately one-half of the circulated air being exhausted from said second area and containing fumous contaminants, said system comprising:
   a. a makeup unit including a means for drawing in the outside air into said system and delivering it to said first area;
   b. a heat exchanger positioned in said system between the intake of said outside air and said makeup unit, said heat exchanger including a first means for passing said incoming air therethrough, said heat exchanger further including a second means for passing the fumous contaminated air exhausted from said second area therethrough, said first and second means being separated by a wall of heat conductive material, whereby heat is transferred between said incoming air and said fumous contaminated air while preventing actual mixing of the air masses;
   c. a dust collector positioned in the system between said first and second areas and receiving the solid contaminated air exhausted from said first area, said dust collector including a means therein for separating the solid particles present in said solid contaminated air from the clean air in preparation for the delivery of the cleansed air to said second area; and
   d. means connecting said heat reclaimer, makeup unit, and said dust collector with said first and second areas for providing an airflow path through said system.

7. The temperature and humidity control system according to claim 6 wherein said first means in said heat exchanger comprises a first set of passageways therethrough in one direction through which the incoming air passes and said second means in said heat exchanger comprises a second set of passageways extending transversely to and in alternating relation with said first set of passageways through which said fumous contaminated air passes, said first and second passageways being separated by a relatively thin sheet of heat conductive material.

8. The temperature and humidity control system according to claim 7 wherein said first and second passageways include at least one support member extending between and in engagement with adjacent surfaces of said thin sheets of heat conductive material, said supports including a strip of vibration absorbing material attached to the surfaces of said support which engage said thin sheets.

9. The temperature and humidity control system according to claim 6 wherein said makeup unit further comprises a mechanical heating/cooling unit for cooling said incoming air in summer months and heating said incoming air in the winter months.

10. The temperature and humidity control system according to claim 9 wherein said heating/cooling unit further comprising a compressor, a spray coil connected to one side of said compressor and over which said incoming air passes, said coil receiving cooling media in the summer and heating media in the winter, a condenser coil connecting said spray coil and the other side of said compressor.

11. The temperature and humidity control system according to claim 10 wherein said spray coil is enclosed within a housing through which said incoming air passes, said housing including a means for increasing the moisture content of said incoming air.

12. The temperature and humidity control system according to claim 10 wherein said condenser coil is enclosed in a housing through which the fumous contaminated air leaving said heat exchanger passes, whereby heat is transferred between the condenser coil and the air passing therethrough.

13. The temperature and humidity control system according to claim 6 where in an air washer is positioned in the airflow path between said dust collector and said second area to provide a cooling effect on the cleansed air and to control the humidity thereof before the air enters said second area.

14. The temperature and humidity control system according to claim 6 wherein the means connecting said heat reclaimer, makeup unit, and said dust collector with said first and second areas comprises a series of conduits, the conduit connecting said second area and said heat reclaimer including a means for spraying water on the exterior surface thereof during the summer months when said first and second areas are being cooled.